(No Model.)   2 Sheets—Sheet 1.
L. H. A. SCHWARTZ.
STOP MOTION FOR WARPING MACHINES.

No. 395,851.   Patented Jan. 8, 1889.

WITNESSES:
Th. Rollé.
Jas. H. Kelly.

INVENTOR:
Lewis H. A. Schwartz
BY John A. Wiedersheim
ATTORNEY.

(No Model.) 2 Sheets—Sheet 2.
L. H. A. SCHWARTZ.
STOP MOTION FOR WARPING MACHINES.
No. 395,851. Patented Jan. 8, 1889.
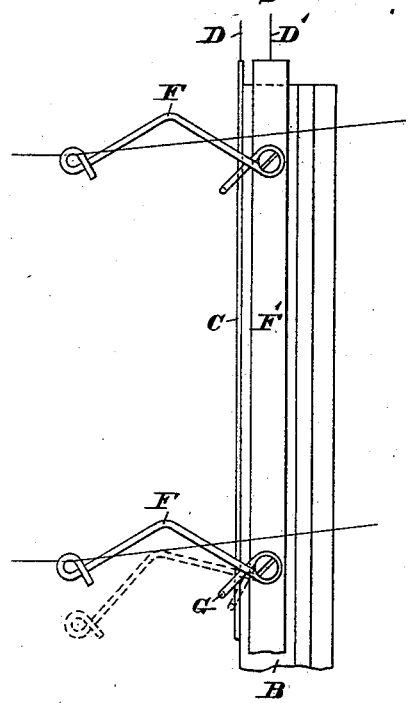
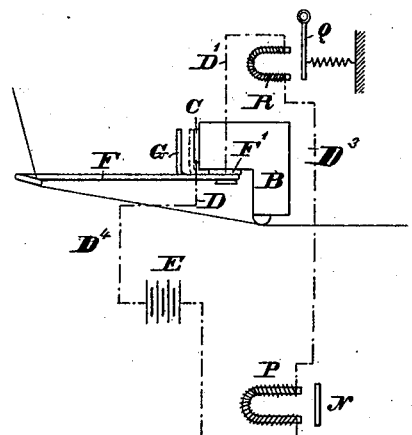
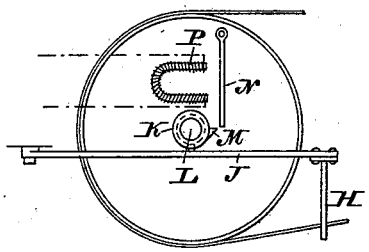
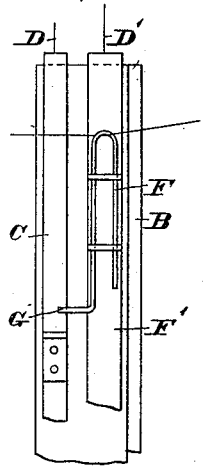
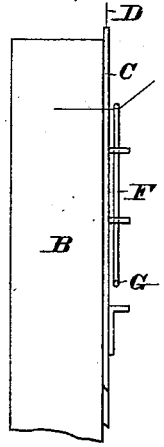
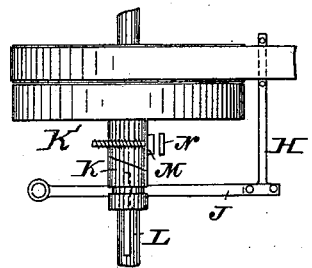
WITNESSES:
Th. Rollé
Jas. F. Kelly
INVENTOR
Lewis H. A. Schwartz
BY John A. Sudersheim
ATTORNEY.

United States Patent Office.

LEWIS H. A. SCHWARTZ, OF PHILADELPHIA, PENNSYLVANIA, ASSIGNOR TO JOHN A. WIEDERSHEIM, OF SAME PLACE.

STOP-MOTION FOR WARPING-MACHINES.

SPECIFICATION forming part of Letters Patent No. 395,851, dated January 8, 1889.

Application filed March 30, 1887. Serial No. 232,949. (No model.)

*To all whom it may concern:*

Be it known that I, LEWIS H. A. SCHWARTZ, a subject of the King of Prussia, Germany, having resided in the United States for over one year last past, and declared my intention of becoming a citizen thereof, and a resident of Philadelphia, State of Pennsylvania, have invented a new and useful Improvement in Stop-Motions for Warping-Machines, which improvement is fully set forth in the following specification and accompanying drawings, in which—

Figure 1:
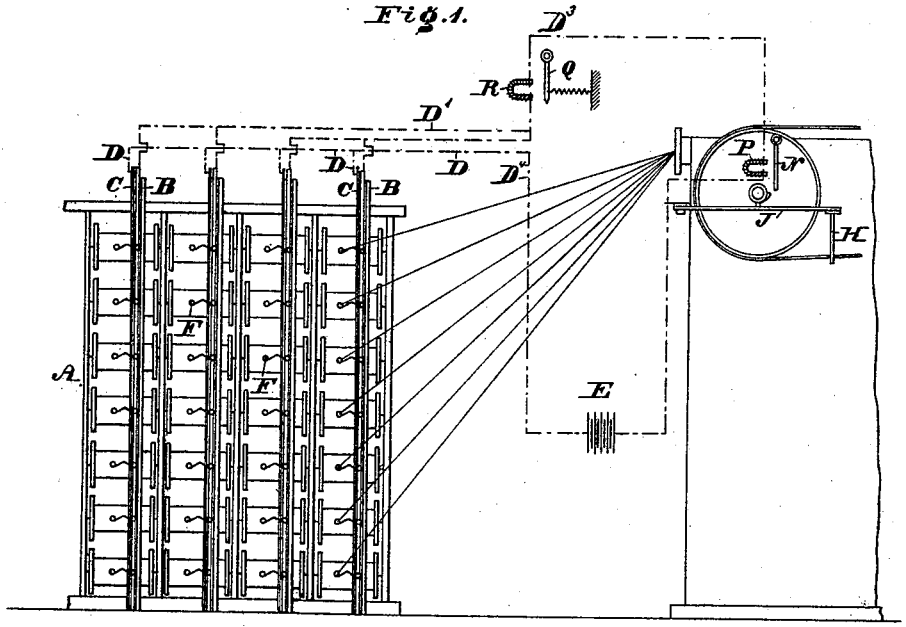
Figure 2:
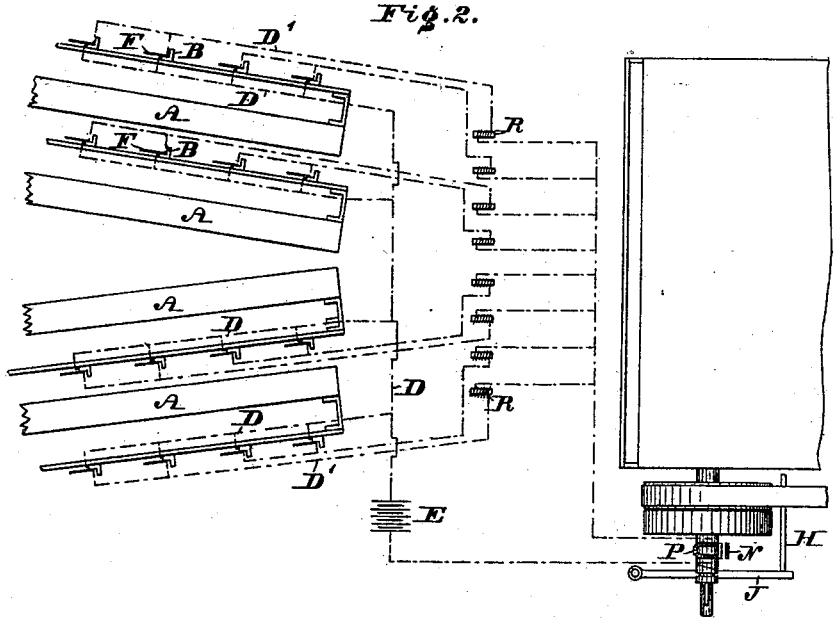

Figure 1 is a side elevation of a stop-motion for a warping-machine with my improvement shown in diagrammatic view. Fig. 2 represents a top or plan view thereof. Fig. 3 represents a side elevation of a detached portion on an enlarged scale. Fig. 4 represents a top view of the parts shown in Fig. 3. Fig. 5 represents a side elevation of a detached portion on an enlarged scale. Fig. 6 represents a top view of the parts shown in Fig. 5. Figs. 7 and 8 represent side elevations of a modification.

Similar letters of reference indicate corresponding parts in the several figures.

My invention relates to improvements in stopping mechanism for warping-machines; and it consists of the combination of parts, as herein set forth and claimed.

It further consists of an annunciator or "tell-tale" for indicating the location of broken yarn.

Referring to the drawings, A represents the creels of a warping-machine, which, excepting the features of my invention applied thereto, are of usual construction. Secured to the uprights B of the frames of the creels are plates C, of copper or other suitable metal, which are connected with wires D, the latter being in communication with a battery, E.

F represents the yarn-guides of the creels, the same being pivoted to plates F', of copper or other suitable metal, said plates having connected with them wires D' and secured to the uprights B, and said guides having heels G, which are so disposed that when the guides are held in elevated position by the yarn said heels G are removed from the plates C, and when said guides are in their lowermost position the heels G are in contact with said plates. The plates F', to which the guides F are pivoted, are all connected electrically by wires D' to a common wire, $D^3$, passing through the magnet P near the stop-motion, and thence to one pole of the battery E, while the plates C are connected similarly to another wire, $D^4$, running to the other pole of the battery. In other words, the plates C and F' are all in normally-open multiple-arc circuits between the wires $D^3$ and $D^4$, and each of such multiple-arc circuits contains an indicator-magnet, R, for operating a tell-tale pointer.

H represents the shipper of the machine, the same being connected with an arm, J, which is pivoted to a suitable part of the machine and engages with a shipper-sleeve, K, having free longitudinal motion on the shaft L, but rotatable therewith by means of a spline. Lateral movement is given to this sleeve and to the arm J through the agency of the bevel-sleeve K', which is loosely mounted on the shaft L, and provided with the abutment M, adapted to be engaged at certain times by the pivoted arm N, depending from the machine. The adjacent ends of said sleeves K and K' are cut obliquely, or formed with cam contact-surfaces, so that when the said sleeve K' is engaged by the said arm N the said sleeve K is pushed outwardly. Adjacent to the arm N is the magnet P, which is in the electric circuit and adapted to attract said arm N and place it in position to engage said abutment M, and thus stop said sleeve K' from rotating, whereby, owing to the inclined or cam contact-faces of the sleeves, the outer one, or K, is moved laterally outward, thereby moving the arm J and shipper H, and thus shifting the driving-belt, so that the machine will be stopped.

R R are a series of electro-magnets, each located in a separate multiple-arc branch running from the plates C F', in circuits D', and adapted to actuate indicators, pointers, fingers, or armatures Q, as will be explained hereinafter.

I may employ as many fingers as I may have columns of spools in the creels, the magnets operating said fingers being placed in contact with either the wires D or D', and may locate all of the fingers in a suitable box for convenience of observation of the operation of said fingers, this feature of my invention constituting an annunciator or tell-tale of the location of broken yarn.

The construction and relative arrangement of each finger and its magnet being similar to that shown in Figs. 1 and 4, a figure illustrative of the series is therefore not inserted in the drawings.

The operation is as follows: When the yarn is properly running from the spools of the creels to the desired frame or take-up mechanism for making the warp, said yarn holds the guides F raised, as shown at the top of Fig. 3. Should, however, the yarn break, the guide through which the same passes loses its support by the yarn and drops, thus bringing the heel G in contact with the relative plate C, (see bottom of Fig. 3,) whereby the electric circuit is closed. The arm N is now attracted by the magnet P and caused to strike the abutment M, whereby the sleeve K is operated and the machine stopped in the manner hereinbefore stated. Two pulleys, one loose and the other fixed to the shaft, in a manner well understood, are shown in Fig. 2 with a belt and a well-known form of belt-shipper, H. Furthermore, the magnet R of the column in which the broken yarn exists attracts the respective index Q, whereby the movement of the latter indicates or announces the location of the broken yarn, and the latter may receive proper attention, after which the fallen guide is raised by the yarn as united, and thus the heel G is withdrawn from the plate C, the circuit then being again broken. The arm J now being operated by hand, so as to shift the belt to the fast pulley, the sleeves K and K' are also restored to their normal condition, and the machine is again started.

It will be seen that the yarn-guides are located close to the spools so as to cause prompt action of the stopping mechanism of the machine.

In Figs. 7 and 8 the guides are shown as adapted to slide in bearings on plates F' of the creels, whereby the heels or heel ends of the guides, when the latter drop, may come in contact with shoulders on the plates C, or with the ends of the plates themselves, if so desired, and it is evident that the heels G may be dispensed with in either case, so that the guides may come directly in contact with the plates C or shoulders thereon.

Having thus described my invention, what I claim as new, and desire to secure by Letters Patent, is—

1. The electrically-insulated plates C and F', in combination with the yarn-guide F pivoted to said plate F', and having the heel G, an electric generator with wires leading to said plates, a magnet in the circuit, an arm operated by said magnet, a driving-shaft with fast and loose pulleys thereon, the sleeve K, feathered on said shaft, and the loose sleeve K', with abutment M, said sleeves having cam contact-faces, the arm J, with shipper H, and a driving-belt, substantially as and for the purpose set forth.

2. The creels A, having the uprights B, the series of insulated plates C and F', secured to said uprights B, a series of guides, F, pivoted to one of the series of plates and normally disconnected from the other, an electric generator with main wires and a series of branch wires, the latter connecting the main wires to the said plates, the magnet P in said main circuit, a pivoted arm controlled by said magnet, a driving-shaft with fast and loose pulleys thereon, a belt, a shipper-actuating mechanism mounted on said driving-shaft and consisting of two sleeves having cam contact-faces, one of said sleeves having an abutment adapted to be in contact with the magnet-controlled arm, and the other sleeve feathered on said shaft, an arm actuated by the feathered sleeve and having a shipper, and a magnet and an indicator in each branch circuit, said parts being combined substantially as and for the purpose set forth.

3. A warping-machine having creels, and uprights secured to the frame of said creels, yarn-guides having supports connected to said frame, an electric generator, main wires connected with the generator, branch wires connected with the main wires and secured to said uprights, electric connections between said main wires and the yarn-guides, a magnet in the circuit, an arm operated by said magnet, a driving-shaft with fast and loose pulleys thereon, a sleeve feathered on said shaft, a loose sleeve on said shaft provided with an abutment, said sleeves having cam contact-faces, an arm with a shipper, and a driving-belt, substantially as described.

LEWIS H. A. SCHWARTZ.

Witnesses:
JOHN A. WIEDERSHEIM,
JAMES F. KELLY.